United States Patent
Kamiya et al.

(10) Patent No.: US 9,739,515 B2
(45) Date of Patent: Aug. 22, 2017

(54) HEAT PUMP DEVICE, AIR CONDITIONER, AND FREEZER THAT EFFICIENTLY HEATS REFRIGERANT ON STANDBY

(75) Inventors: Shota Kamiya, Tokyo (JP); Kazunori Hatakeyama, Tokyo (JP); Kenta Yuasa, Tokyo (JP); Shinya Matsushita, Tokyo (JP); Shinsaku Kusube, Tokyo (JP); Tsutomu Makino, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 259 days.

(21) Appl. No.: 14/388,266

(22) PCT Filed: Apr. 16, 2012

(86) PCT No.: PCT/JP2012/060296
§ 371 (c)(1),
(2), (4) Date: Sep. 26, 2014

(87) PCT Pub. No.: WO2013/157074
PCT Pub. Date: Oct. 24, 2013

(65) Prior Publication Data
US 2015/0089972 A1  Apr. 2, 2015

(51) Int. Cl.
*F25B 49/02* (2006.01)
*F04C 29/04* (2006.01)
(Continued)

(52) U.S. Cl.
CPC ............ *F25B 49/025* (2013.01); *F04C 28/06* (2013.01); *F04C 29/04* (2013.01); *F25B 1/005* (2013.01);
(Continued)

(58) Field of Classification Search
CPC ........ F25B 2313/025; F25B 2313/0251; F25B 47/02; F24F 3/065; F24F 2011/009; F24F 2011/0002; B60H 1/32; B60H 1/00907
(Continued)

(56) References Cited

U.S. PATENT DOCUMENTS 4,417,193 A * 11/1983 Hirata ..................... H02P 27/06
318/803
5,195,327 A   3/1993 Kim
(Continued)

FOREIGN PATENT DOCUMENTS

EP   1 111 764 A2   6/2001
JP   60-068341 U    5/1985
(Continued)

OTHER PUBLICATIONS

Extended European Search Report dated Jan. 21, 2016 issued in corresponding EP patent application No. 12874570.0.
(Continued)

*Primary Examiner* — Etsub Berhanu
*Assistant Examiner* — Nelson Nieves
(74) *Attorney, Agent, or Firm* — Posz Law Group, PLC

(57) ABSTRACT

A heat pump device includes a compressor including a compression mechanism that compresses a refrigerant and a motor that drives the compression mechanism, an inverter that applies a voltage for driving the motor, a converter that applies a voltage to the inverter, an inverter control unit that generates a driving signal for driving the inverter, and a converter control unit that generates a driving signal for driving the converter. The inverter control unit includes a heating-operation-mode control unit that controls a driving-signal generating unit such that the driving-signal generating unit outputs, as inverter driving signals, PWM signals for heating the compressor without rotationally driving the
(Continued)

motor by feeding a high-frequency current that the motor cannot follow in a heating operation mode.

11 Claims, 10 Drawing Sheets

(51) Int. Cl.
    *H02M 7/48*            (2007.01)
    *F25B 13/00*           (2006.01)
    *F04C 28/06*           (2006.01)
    *F25B 1/00*             (2006.01)
    *F25B 30/02*           (2006.01)
    *H02M 1/00*           (2006.01)
    *H02M 7/5387*         (2007.01)

(52) U.S. Cl.
    CPC .............. *F25B 13/00* (2013.01); *F25B 30/02* (2013.01); *F25B 49/022* (2013.01); *H02M 7/48* (2013.01); *F04C 2210/00* (2013.01); *F04C 2240/403* (2013.01); *F04C 2270/12* (2013.01); *F25B 2341/0662* (2013.01); *F25B 2400/053* (2013.01); *F25B 2400/054* (2013.01); *F25B 2400/13* (2013.01); *F25B 2600/021* (2013.01); *F25B 2700/15* (2013.01); *H02M 2001/007* (2013.01); *H02M 2007/53876* (2013.01); *Y02B 30/741* (2013.01)

(58) Field of Classification Search
    USPC .......................................... 318/798, 599, 811
    See application file for complete search history.

(56) References Cited

U.S. PATENT DOCUMENTS

| | | | | |
|---|---|---|---|---|
| 5,225,712 | A * | 7/1993 | Erdman | F03D 7/0272 290/44 |
| 5,272,429 | A * | 12/1993 | Lipo | H02P 6/187 318/802 |
| 5,663,627 | A * | 9/1997 | Ogawa | F24F 11/0009 318/803 |
| 6,023,420 | A * | 2/2000 | McCormick | H02M 7/5387 336/212 |
| 6,244,061 | B1 * | 6/2001 | Takagi | F25B 49/025 62/228.4 |
| 9,276,516 | B2 * | 3/2016 | Harada | F25B 31/006 |
| 2004/0159115 | A1 * | 8/2004 | Matsunaga | F04C 18/0215 62/228.1 |
| 2006/0179859 | A1 * | 8/2006 | Nakata | H02P 6/06 62/228.1 |
| 2008/0041081 | A1 * | 2/2008 | Tolbert | F25B 49/025 62/228.4 |
| 2009/0102285 | A1 * | 4/2009 | Haga | H02M 1/12 307/31 |
| 2009/0237016 | A1 | 9/2009 | Iwashita et al. | |
| 2009/0324426 | A1 * | 12/2009 | Moody | F04B 39/0207 417/13 |
| 2010/0085000 | A1 * | 4/2010 | Todd | F25B 49/025 318/400.2 |
| 2010/0301784 | A1 * | 12/2010 | Tagome | H02M 1/28 318/139 |
| 2011/0198921 | A1 * | 8/2011 | Sone | B60L 11/1887 307/10.1 |
| 2011/0234144 | A1 * | 9/2011 | Maekawa | H02P 23/04 318/702 |
| 2011/0256005 | A1 * | 10/2011 | Takeoka | H02P 6/18 417/415 |
| 2012/0096881 | A1 | 4/2012 | Sakanobe et al. | |
| 2012/0111043 | A1 * | 5/2012 | Hatakeyama | F04C 29/0085 62/190 |
| 2012/0161525 | A1 * | 6/2012 | Hong | H02P 27/08 307/73 |
| 2012/0163046 | A1 | 6/2012 | Hibino | |
| 2012/0234031 | A1 | 9/2012 | Hatakeyama et al. | |
| 2012/0286292 | A1 * | 11/2012 | Nakayama | H01L 23/24 257/77 |
| 2013/0152609 | A1 | 6/2013 | Hatakeyama et al. | |
| 2013/0180273 | A1 | 7/2013 | Hatakeyama et al. | |
| 2013/0291578 | A1 | 11/2013 | Hatakeyama et al. | |

FOREIGN PATENT DOCUMENTS

| | | | |
|---|---|---|---|
| JP | 61-091445 A | 5/1986 | |
| JP | 08-226714 A | 9/1996 | |
| JP | EP 0866284 A2 * | 9/1998 | .............. F04B 35/04 |
| JP | 11-159467 A | 6/1999 | |
| JP | 2002-106909 A | 4/2002 | |
| JP | 2004-271167 A | 9/2004 | |
| JP | 2007-162978 A | 6/2007 | |
| JP | 2007-166766 A | 6/2007 | |
| JP | 2009-232537 A | 10/2009 | |
| JP | 4529540 B2 | 6/2010 | |
| JP | 2011-002190 A | 1/2011 | |
| JP | 2011-091992 A | 5/2011 | |
| JP | 2011-144966 A | 7/2011 | |
| JP | 2011-151948 A | 8/2011 | |
| WO | 2011/018863 A1 | 2/2011 | |
| WO | 2011013277 A1 | 2/2011 | |
| WO | 2011/074145 A1 | 6/2011 | |
| WO | 2012/029099 A1 | 3/2012 | |
| WO | 2012049763 A1 | 4/2012 | |
| WO | 2012086010 A1 | 6/2012 | |

OTHER PUBLICATIONS

Australian Office Action issued on Jul. 20, 2015 in the corresponding Australian application No. 2012377681.
Office Action mailed on May 19, 2015 in the corresponding JP application No. 2014-510988. ( Partial english translation attached ).
International Search Report of the International Searching Authority mailed Jun. 5, 2012 for the corresponding international application No. PCT/JP2012/060296 (and English translation).

* cited by examiner

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | -U | 0 | 1 | 1 | 1 | 0 | 0 |
| V4 | +U | 1 | 0 | 0 | 0 | 1 | 1 |
| V5 | -V | 1 | 0 | 1 | 0 | 1 | 0 |
| V6 | -W | 1 | 1 | 0 | 0 | 0 | 1 |
| V7 | 0 | 1 | 1 | 1 | 0 | 0 | 0 |

# HEAT PUMP DEVICE, AIR CONDITIONER, AND FREEZER THAT EFFICIENTLY HEATS REFRIGERANT ON STANDBY

CROSS REFERENCE TO RELATED APPLICATION

This application is a U.S. national stage application of International Patent Application No. PCT/JP2012/060296 filed on Apr. 16, 2012.

TECHNICAL FIELD

The present invention relates to a heat pump device, an air conditioner, and a freezer.

BACKGROUND

Heat pump devices exist that supply a high-frequency low voltage to a compressor during a shutdown during heating in order to improve the rising speed of the air conditioner when heating is started (for example, see Patent Literature 1). A similar technique is used in a heat pump device that supplies a single-phase alternating-current voltage having a higher frequency than that at the time of a normal operation to a compressor when it is detected that the temperature of the air conditioner's surroundings becomes low (for example, see Patent Literature 2).

Moreover, in order to prevent the refrigerant stagnation phenomenon from occurring, a heat pump device exists that generates, as driving signals for a compressor motor, signals to be output with a predetermined static phase angle in the PWM output in a two-phase modulation system during the restricted energization for preheating the compressor (for example, see Patent Literature 3). A technology of stepping down, with a converter unit, an input voltage to an inverter is described in Patent Literature 4.

PATENT LITERATURE

Patent Literature 1: Japanese Utility Model Publication No. S60-68341
Patent Literature 2: Japanese Patent Application Laid-Open No. S61-91445
Patent Literature 3: Japanese Patent Application Laid-Open No. 2007-166766
Patent Literature 4: Japanese Patent Application Laid-Open No. 2005-326054

The above Patent Literatures 1 and 2 disclose a technique facilitating a lubricating action in the compressor by heating the compressor or keeping the compressor warm by applying a high-frequency alternating-current voltage to the compressor in response to a decrease in outside air temperature.

However, there is no detailed description in Patent Literature 1 of the high-frequency low voltage, and the output change, which depends on the stop position of the rotor, is not taken into consideration. Therefore, there is a problem in that the desired amount of heat for the compressor may not be obtained.

In contrast, there is a description in the above Patent Literature 2 of an application of a voltage from a high-frequency (e.g., 25 kilohertz) single-phase alternating-current power supply and the effects, such as noise reduction due to being outside the audible range, vibration suppression due to being outside the resonance frequency, input reduction and prevention of temperature increase due to the reduction in electric current by the amount of inductance in the winding, and rotation suppression of the rotating part of the compressor.

However, in the technique in Patent Literature 2, because a high-frequency single-phase alternating-current power supply is used, a fully-off period, during which all the switching elements are off, is generated for a relatively long time as shown in FIG. 3 in Patent Literature 2. At this point, a high-frequency current is regenerated to the direct-current power supply without it flowing back to the motor via the reflux diodes and the electric current decays fast during the off-period; therefore, there is a problem in that a high-frequency current does not efficiently flow to the motor and thus the heating efficiency of the compressor degrades. Moreover, when a small motor having low iron loss is used, the amount of heat generation becomes small with respect to the applied voltage; therefore, there is a problem in that the necessary amount of heat cannot be obtained with a voltage that is within the usable range.

Moreover, Patent Literature 3 discloses a technique of performing preheating such that the rotor does not rotate by performing restricted energization in which a direct current is caused to flow in the motor winding.

Patent Literature 4 discloses a technique of stepping down, with the converter unit, an input voltage to the inverter as shown in FIG. 1 of Patent Literature 4.

However, the winding resistance of a motor tends to decrease due to the highly efficient design of recent motors. Therefore, in the case of the preheating method of causing a direct current to flow in the motor winding as described in Patent Literatures 3 and 4, because the amount of heat generation is given by the product of the winding resistance and the square of the electric current, the electric current is increased by the amount of reduction of the winding resistance. Consequently, a problem arises with the heat generation due to the increase of the inverter loss and thus problems arise such as a decrease in reliability and an increase in the cost of heat dissipation structures.

In recent years, high-efficiency heating is demanded to meet the Europe EuP Command (Directive on Eco-Design of Energy-using Products) and the Australian MEPS (Minimum Energy Performance Standards), which are strict environmental consideration design standards.

SUMMARY

The present invention has been achieved in view of the above and it is an object of the present invention to obtain a heat pump device, an air conditioner, and a freezer that can efficiently heat a refrigerant on standby, stably and efficiently realize a necessary heating output, and reduce vibration and noise of a bearing in a compressor.

In order to solve the above problems and achieve the object, the present invention relates to a heat pump device including a compressor including a compression mechanism that compresses a refrigerant and a motor that drives the compression mechanism, an inverter that applies a voltage for driving the motor, a converter that applies a voltage to the inverter, an inverter control unit that generates a first driving signal for driving the inverter, and a converter control unit that generates a second driving signal for driving the converter, wherein the inverter control unit includes a heating operation mode in which a heating operation of the compressor is performed and a normal operation mode in which a refrigerant is compressed by performing a normal operation of the compressor and the converter control unit sets, in the heating operation mode of the inverter control unit, a voltage applied to the inverter on the basis of a voltage command value for the motor.

The heat pump device, the air conditioner, and the freezer according to the present invention attain an effect that it is possible to efficiently heat a refrigerant on standby, stably and efficiently realize a necessary heating output, and reduce vibration and noise of a bearing in a compressor.

DETAILED DESCRIPTION

Exemplary embodiments of a heat pump device, an air conditioner, and a freezer according to the present invention will be explained in detail with reference to the drawings. Note that the present invention is not limited by the embodiments.

First Embodiment

Figure 1:
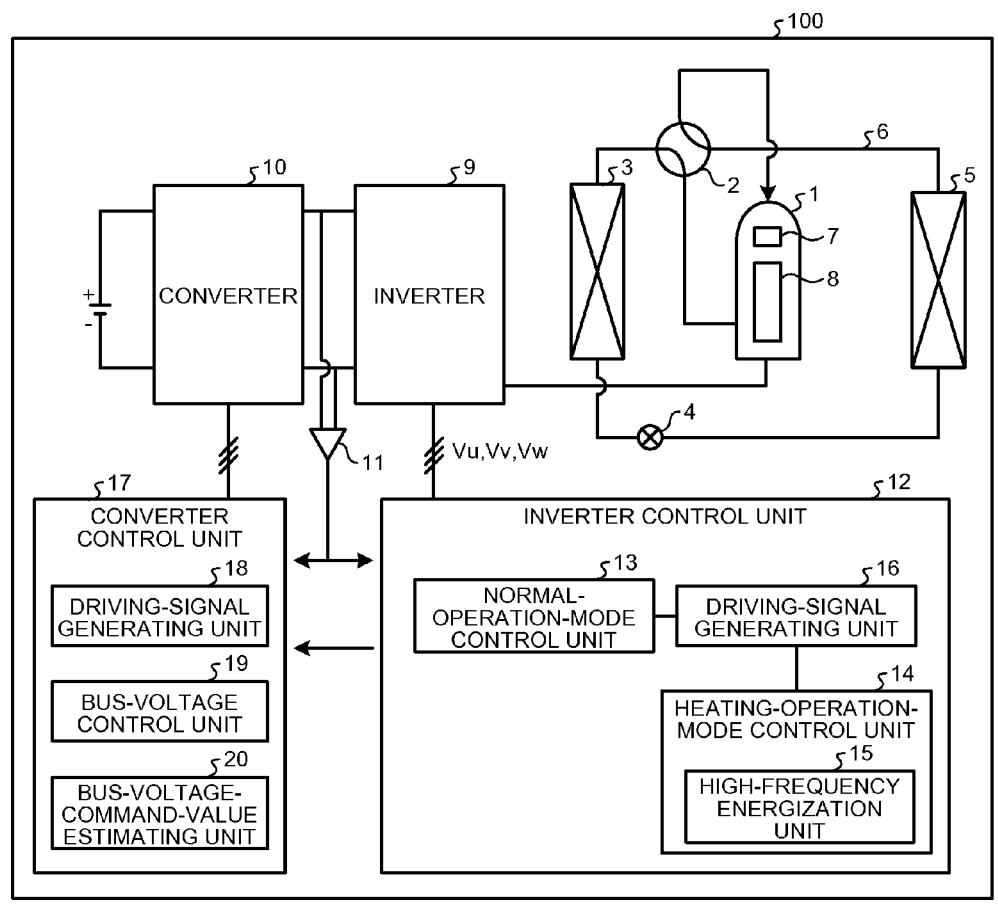
FIG. 1 is a diagram of a configuration example of a heat pump device in a first embodiment.

FIG. 1 is a diagram of a configuration example of a first embodiment of a heat pump device according to the present invention. A heat pump device 100 according to the present embodiment includes a refrigerating cycle in which a compressor 1, a four-way valve 2, a heat exchanger 3, an expansion mechanism 4, and a heat exchanger 5 are connected in order via a refrigerant pipe 6. A compression mechanism 7, which compresses a refrigerant, and a motor 8, which drives the compression mechanism 7, are provided in the compressor 1. The motor 8 is a three-phase motor including windings of three phases, i.e., U-phase, V-phase, and W-phase.

An inverter 9 that applies voltage to the motor 8 to drive the motor 8 is electrically connected to the motor 8. The inverter 9 uses a direct-current voltage (bus voltage) Vdc as a power supply and applies voltages Vu, Vv, and Vw to the U-phase, V-phase, and W-phase windings of the motor 8, respectively. An inverter control unit 12 is electrically connected to the inverter 9. The inverter control unit 12 has two operation modes, i.e., a normal operation mode and a heating operation mode. The inverter control unit 12 includes a normal-operation-mode control unit 13 and a heating-operation-mode control unit 14 that control the respective modes. The inverter control unit 12 includes a driving-signal generating unit 16 and a refrigerant-stagnation detecting unit 25. The driving-signal generating unit 16 generates a signal for driving the inverter 9 and outputs the signal to the inverter 9. The refrigerant-stagnation detecting unit 25 monitors stagnation of the refrigerant and, when detecting stagnation of the refrigerant, outputs a signal indicating the refrigerant stagnation.

In the inverter control unit 12, the normal-operation-mode control unit 13 is used when the heat pump device 100 performs a normal operation. The normal-operation-mode control unit 13 controls the driving-signal generating unit 16 such that it outputs, as inverter driving signals, PWM (Pulse Width Modulation) signals for rotationally driving the motor 8.

The heating-operation-mode control unit 14 is used when the compressor 1 is heated (when the signal indicating the refrigerant stagnation is output from the refrigerant-stagnation detecting unit 25). When the signal indicating the refrigerant stagnation is output from the refrigerant-stagnation detecting unit 25, the heating-operation-mode control unit 14 controls the driving-signal generating unit 16 such that it outputs, as inverter driving signals, PWM signals for heating the compressor 1 without rotationally driving the motor 8 by feeding a high-frequency current that the motor 8 cannot follow. At this point, a high-frequency energization unit 15 of the heating-operation-mode control unit 14 controls the driving-signal generating unit 16. The driving-signal generating unit 16 drives the inverter 9 by outputting the PWM signals, thereby heating and vaporizing a liquid refrigerant stagnated in the compressor 1 in a short time and discharging the liquid refrigerant to the outside of the compressor 1.

The output voltage of a converter 10 is applied to the inverter 9. The converter 10 is driven by a converter control unit 17. The converter control unit 17 includes a bus-voltage-command-value estimating unit 20, a bus-voltage control unit 19, and a driving-signal generating unit 18. The converter control unit 17 generates a driving signal for the converter 10 on the basis of a signal from the inverter control unit 12 and a signal (a detection value of a bus voltage) from a bus-voltage detecting unit 11 and outputs the driving signal to the converter 10. The converter control unit 17 controls the converter 10 in this way to output a given bus voltage to the inverter 9.

Figure 2:
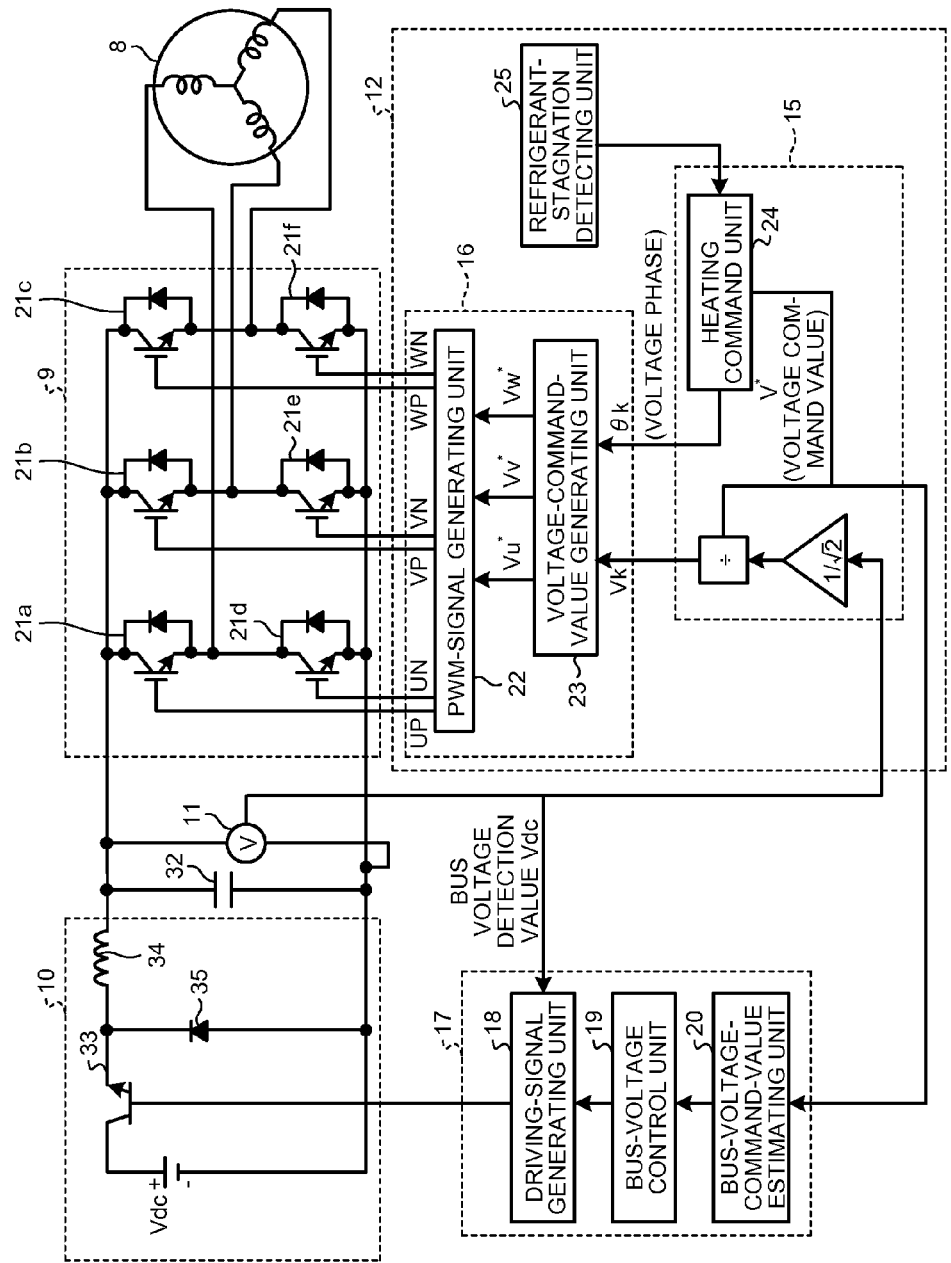
FIG. 2 is a diagram of an example of a detailed configuration of a main part of the heat pump device.

FIG. 2 is a diagram of an example of a detailed configuration of a main part of the heat pump device. FIG. 2 shows the configurations of the inverter 9, the converter 10, the inverter control unit 12, and the converter control unit 17. The inverter 9 is a circuit that includes six switching elements ($21a$, $21d$, $21b$, $21e$, $21c$, and $21f$) and in which three series connecting units of the switching elements on the upper side (a character representing the upper elements is P) and the lower side (a character representing the lower elements is N) are connected in parallel. The inverter 9 drives, with PWM signals UP, UN, VP, VN, WP, and WN sent from the inverter control unit 12, the switching elements respectively corresponding to the PWM signals to generate the three-phase voltages Vu, Vv, and Vw and then applies these voltages to the U-phase, the V-phase, and the −W phase windings of the motor 8, respectively. The bus-voltage detecting unit 11 for detecting Vdc is provided on the input side of the inverter 9 (the side from which the bus voltage Vdc is supplied).

The heating-operation-mode control unit 14 of the inverter control unit 12 includes the high-frequency energization unit 15. Note that, in FIG. 2, only components that perform a characteristic operation in the heat pump device in the present embodiment are shown and the normal-operation-mode control unit 13 and the like shown in FIG. 1 are not shown.

When detecting, with a heating command unit 24, the signal indicating the refrigerant stagnation from the refrigerant-stagnation detecting unit 25, the high-frequency energization unit 15 of the heating-operation-mode control unit 14 generates a high-frequency voltage command Vk and a high-frequency phase command θk. A voltage-command-value generating unit 23 of the driving-signal generating unit 16 generates voltage command values Vu*, Vv*, and Vw* for the respective three phases (U-phase, V-phase, and W-phase) on the basis of the high-frequency voltage command Vk and the high-frequency phase command θk that are input from the high-frequency energization unit 15. A PWM-signal generating unit 22 generates PWM signals (UP, VP, WP, UN, VN, and WN) on the basis of the three-phase voltage command values Vu*, Vv*, and Vw* and drives the inverter 9, thereby causing the inverter 9 to apply a voltage to the motor 8. At this point, the PWM-signal generating unit 22 causes the inverter 9 to apply a high-frequency voltage with which a rotor of the motor 8 does not rotate, and heats the compressor 1 including the motor 8.

The output voltage of the converter 10 is applied to the inverter 9. The voltage input to the inverter 9 is smoothed by a smoothing capacitor 32 and applied. The converter 10 is, for example, a step-down converter configured to include a reactor 34, a switching element 33 such as a MOSFET (Metal-Oxide-Semiconductor Field-Effect Transistor), and a backflow preventing element 35 such as a fast recovery diode. Switching of the switching element 33 is controlled by the converter control unit 17. The output voltage of the converter 10, that is, the applied voltage to the inverter 9 is detected by the bus-voltage detecting unit 11.

Figure 3:
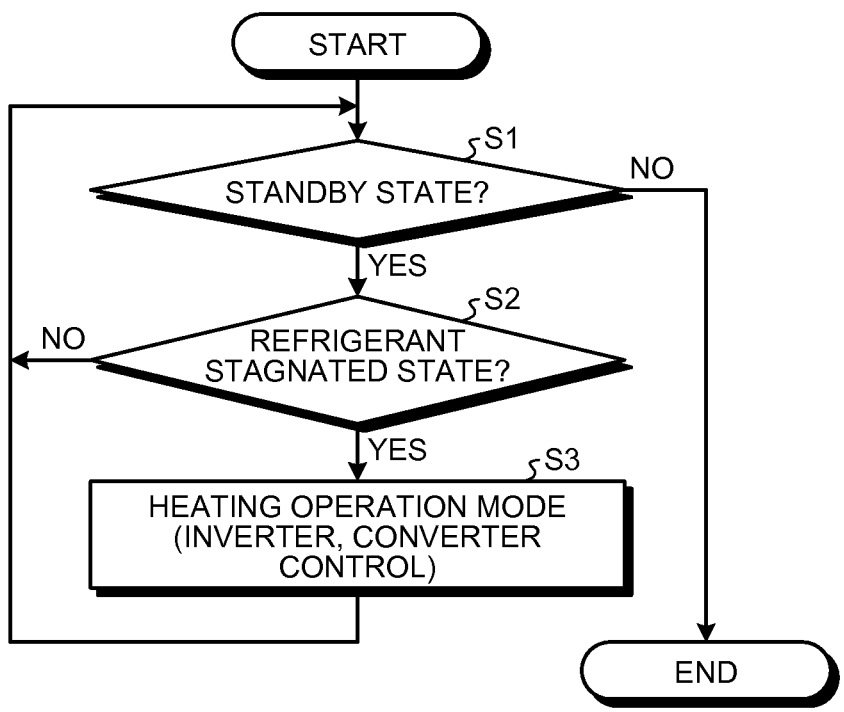
FIG. 3 is a flowchart showing an example of an implementation determination processing procedure for a heating operation mode of the heat pump device.

The detailed operation of the heat pump device 100 in the present embodiment is explained below with reference to the configuration diagrams of FIGS. 1 and 2 and the flowcharts of FIGS. 3 and 4. FIG. 3 is a flowchart showing an example of an implementation determination processing procedure for the heating operation mode of the heat pump device 100.

The inverter control unit 12 determines whether the heat pump device 100 is in a standby state (the compressor 1 is in a stopped state) (step S1). When the heat pump device 100 is in a standby state (Yes at step S1), the refrigerant-stagnation detecting unit 25 determines whether a refrigerant stagnates in the compressor 1 (step S2). When the refrigerant stagnates in the compressor 1 (Yes at step S2), the inverter control unit 12 performs control by the heating-operation-mode control unit 14, shifts to the heating operation mode to perform the operation for heating the compressor 1 (step S3), and returns to step S1.

When the refrigerant does not stagnate in the compressor 1 (No at step S2), the inverter control unit 12 returns to step S1 without shifting to the heating operation mode. When the heat pump device 100 is not in a standby state (No at step S1), the inverter control unit 12 ends the operation of the implementation determination processing and starts operation processing in a state other than the standby state such as a normal operation mode.

Figure 4:
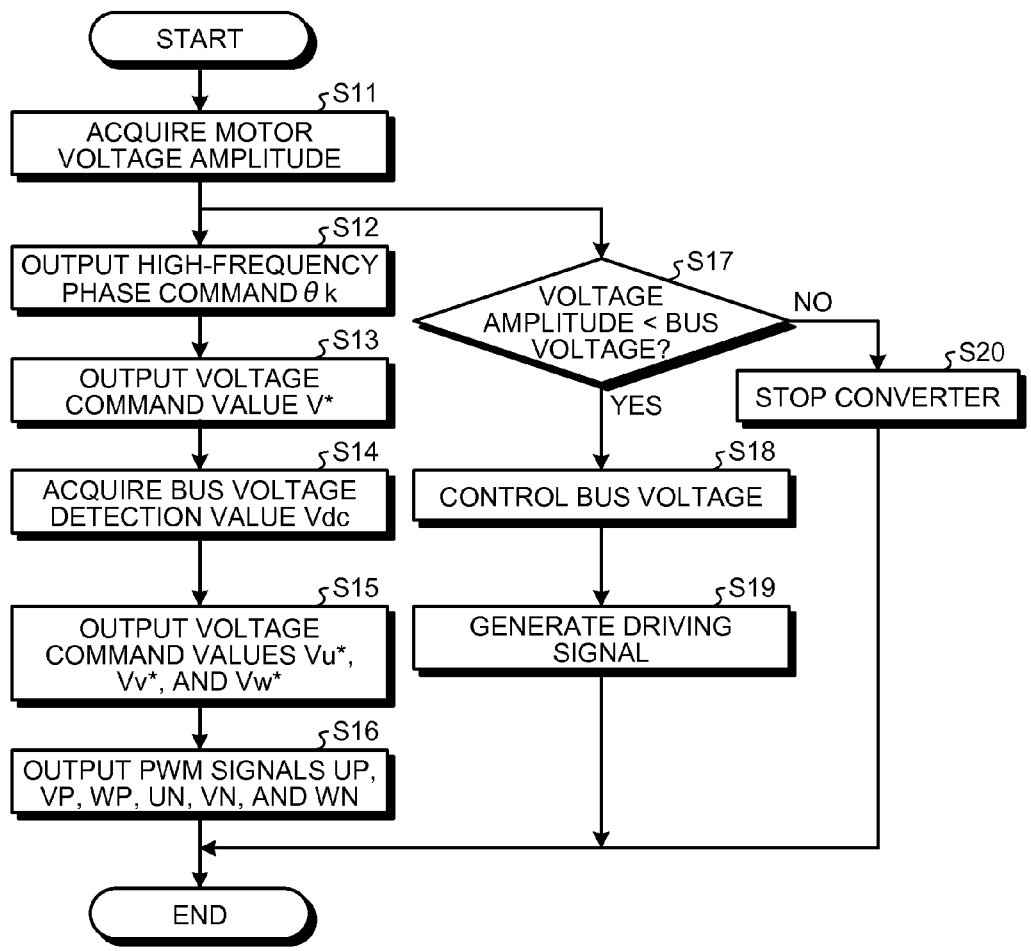
FIG. 4 is a flowchart showing an example of an operation procedure in the heating operation mode.

FIG. 4 is a flowchart showing an example of an operation procedure in the heating operation mode. When the inverter control unit 12 shifts to the heating operation mode, the heating command unit 24 of the high-frequency energization unit 15 of the heating-operation-mode control unit 14 acquires the amplitudes of the voltages applied to the motor (output line voltages Vuv, Vvw, and Vwu) (step S11), generates a high-frequency phase command θk, and outputs the high-frequency phase command θk to the voltage-command-value generating unit 23 of the driving-signal generating unit 16 (step S12). For example, two kinds of angles θ1 and θ2 are given from the outside according to user operation or the like. The high-frequency phase command θk is generated by alternately selecting the two angles at a predetermined cycle. The predetermined cycle may be given from the outside according to user operation or the like. The high-frequency voltage command Vk may be given from the outside according to user operation or the like.

Subsequently, the heating command unit 24 calculates a voltage command value V* given to the motor 8 on the basis of the necessary amount of heat and outputs the voltage command value V* to the voltage-command-value generating unit 23 (step S13). For example, the necessary amount of heat may be set in advance or may be set such that it is changed by a designer according to the temperature of the compressor 1, the ambient environmental temperature, or the like. If the combination of the compressor 1 and the motor 8 is determined, the relation between the voltage command value V* given to the motor 8 and the amount of heat generation (i.e., the amount of heat) is uniquely determined. Therefore, for example, the heating command unit 24 retains, as table data, the correspondence between the amount of heat generation and the voltage command value V* given to the motor 8 according to the types of the motor 8 and the compressor 1 and calculates the voltage command value V* using the necessary amount of heat generation and the data table. Note that the amount of heat generation necessary for heating depends on the outside air temperature, the temperature of the compressor 1, the bus voltage, and the like. Therefore, instead of retaining the correspondence between the necessary amount of heat generation and the voltage command value V* as the table data, the heating command unit 24 can retain, as table data, the correspondence between the outside air temperature, the temperature of the compressor 1, the bus voltage, and the like and the voltage command value V* according to the types of the motor 8 and the compressor 1 and calculate the voltage command value V* by referring to the types of the motor 8 and the compressor 1 and the table data corresponding to the outside air temperature, the temperature of the compressor 1, the bus voltage, and the like. Note that a method of calculating the voltage command value V* is not limited to the example in which the table data is used. For example, the voltage command value V* may be calculated by a predetermined calculation formula or the like according to the amount of heat generation.

Subsequently, the heating-operation-mode control unit 14 acquires a bus voltage detection value Vdc detected by the bus-voltage detecting unit 11 (step S14) and calculates the high-frequency voltage command Vk by dividing the voltage command value V* by a value obtained by multiplying the bus voltage detection value Vdc by $1/\sqrt{2}$. The amount of heat generation necessary for heating changes depending on the outside air temperature, the temperature of the compressor 1, the bus voltage, and the like. Therefore, by calculating the high-frequency voltage command Vk using the bus voltage detection value Vd in this way, it is possible to obtain a more appropriate voltage command value and improve reliability.

The voltage-command-value generating unit 23 calculates voltage command values Vu*, Vv*, and Vw* of the respective phases of the motor on the basis of the high-frequency voltage command Vk and the high-frequency phase command θk and outputs the voltage command values Vu*, Vv*, and Vw* to the PWM-signal generating unit 22 (step S15). The PWM-signal generating unit 22 compares the voltage command values Vu*, Vv*, and Vw* of the respective phases of the motor and the carrier signal having an amplitude Vdc/2 at a predetermined frequency to generate the PWM signals UP, VP, WP, UN, VN, and WN, drives the switching elements 21a to 21f of the inverter 9, and ends the processing (step S16). Consequently, a voltage is applied to the motor 8 by the driving of the switching elements 21a to 21f.

On the other hand, the converter control unit 17 acquires voltage amplitude given to the motor 8 from the inverter control unit 12. The bus-voltage control unit 19 determines whether the voltage amplitude is smaller than the bus voltage detection value Vdc detected by the bus-voltage detecting unit 11 (step S17). When the voltage amplitude is smaller (Yes at step S17), the bus-voltage control unit 19 controls the bus voltage command value such that it is set to 0.5 times of the voltage amplitude given to the motor (step S18). Specifically, the voltage control unit 19 instructs the bus-voltage-command-value estimating unit 20 to set the bus voltage command value to 0.5 times of the voltage amplitude given to the motor. The bus-voltage-command-value estimating unit 20 determines the bus voltage command value as 0.5 times of the voltage amplitude given to the motor. The bus-voltage control unit 19 calculates the on-duty of the switching element 33 on the basis of the bus voltage detection value Vdc and the bus voltage command value determined by the bus-voltage-command-value estimating unit 20 and outputs the on-duty to the driving-signal generating unit 18.

The driving-signal generating unit 18 compares the value of the on-duty and the carrier to generate a driving pulse (a driving signal), and outputs the driving pulse to the converter unit 10 (step S19). The on-duty is a ratio of the on-time of the switching element 33 in the carrier cycle and is set to a value between 0 and 1. Therefore, the carrier amplitude only has to be set to 1. ON/OFF of the switching element 33 is controlled on the basis of the driving pulse signal generated in this way to step down a bus voltage according to a converter operation.

On the other hand, when the voltage amplitude given to the motor 8 is equal to or larger than the bus voltage detection value (No at step S17), the converter control unit 17 stops the converter 10 (step S20) and does not step down the bus voltage.

In the above explanation, the bus voltage command value is set to 0.5 times of the voltage amplitude given to the motor 8 (the voltage applied to the motor 8 by the inverter 9) when the voltage amplitude is smaller than the bus voltage detection value Vdc (the voltage applied to the inverter 9 by the converter 10). However, this multiplying factor is not limited to 0.5 times. Actually, it is also conceivable that motor parameters change according to a heat generation state or the like of the motor and the actual amount of heat generation of the motor is different from the desired amount of heat generation. In this case, the bus voltage command value can be increased or reduced centering on a value of 0.5 times of the amplitude taking into account the fluctuations in the amount of heat generation in advance. For example, it is also possible that the voltage amplitude given to the motor 8 and the bus voltage detection value to be set are retained as a table and the bus voltage detection value is set according to the voltage amplitude given to the motor 8 using the table.

Next, the method of generating the voltage command values Vu*, Vv*, and Vw* in the voltage-command-value generating unit 23 and the method of generating the PWM signals in the PWM-signal generating unit 22 are explained.

When the motor 8 is a three-phase motor, in general, the phases U, V, and W are different from one another by 120° (=2π/3). Therefore, Vu*, Vv*, and Vw* are defined as cosine waves (sine waves) having phases different by 2π/3 from each other as indicated by Equation (1):

$$Vu^* = Vk \times \cos\theta$$

$$Vv^* = Vk \times \cos(\theta - 2\pi/3)$$

$$Vw^* = Vk \times \cos(\theta + 2\pi/3) \qquad (1)$$

The voltage-command-value generating unit 23 calculates the voltage command values Vu*, Vv*, and Vw* of the respective phases according to Equation (1) on the basis of the high-frequency voltage command Vk and the high-frequency phase command θk and outputs the calculated voltage command values Vu*, Vv*, and Vw* to the PWM-signal generating unit 22. The PWM-signal generating unit 22 compares the voltage command values Vu*, Vv*, and Vw* and the carrier signal (reference signal) having an amplitude Vdc (the detection value of the bus voltage)/2 at a predetermined frequency and generates the PWM signals UP, VP, WP, UN, VN, and WN on the basis of the relation of their magnitudes to each other.

Note that, in Equation (1), the voltage command values Vu*, Vv*, and Vw* are calculated using a simple trigonometric function; however, a method of calculating the voltage command values Vu*, Vv*, and Vw* is not limited to this. Other methods, such as a two-phase modulation, a third-harmonic superposition modulation, and a space vector modulation, can be used.

Figures 5, 6:
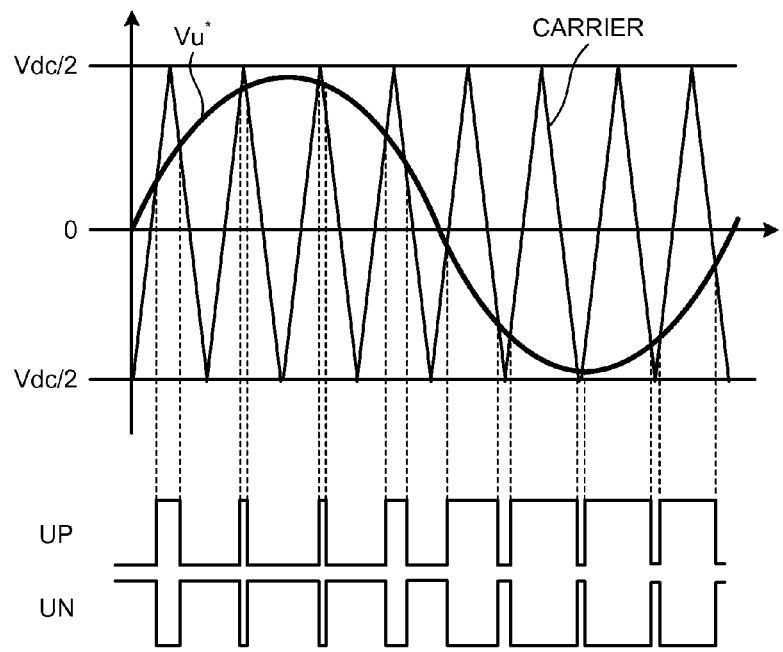
FIG. 5 is a diagram showing a signal generation method for one phase of a PWM-signal generating unit.
FIG. 6 is a diagram showing eight switching pattern examples in the first embodiment.

Next, a PWM-signal generating method in the PWM-signal generating unit 22 is explained. FIG. 5 is a diagram showing a signal generating method for one phase of the PWM-signal generating unit 22. The signal generating method shown in FIG. 5 typically corresponds to a method referred to as an asynchronous PWM. The PWM-signal generating unit 22 compares the voltage command value Vu* and the carrier signal having the amplitude Vdc/2 at a predetermined frequency and generates the PWM signals UP and UN on the basis of the relation of their magnitudes to each other.

In other words, when the carrier signal is larger than the voltage command value Vu*, the PWM signal UP is on and the PWM signal UN is off and, in other cases, the PWM signal UP is off and the PWM signal UN is on. PWM signals in the other phases are generated in the same manner.

FIG. 6 is a chart showing eight switching pattern examples in the present embodiment. Note that, in FIG. 6, voltage vectors generated in the respective switching patterns are described as V0 to V7. The voltage directions of the respective voltage vectors are indicated by adding + or − to the names (U, V, and W) of the phases. When the voltage is not generated, the direction is represented by 0. Here, +U means a voltage for generating an electric current in the U-phase direction, which flows into the motor 8 via the U-phase and flows out from the motor 8 via the V-phase and the W-phase, and −U means a voltage for generating an electric current in the −U-phase direction, which flows into the motor 8 via the V-phase and the W-phase and flows out from the motor 8 via the U-phase. The same applies to ±V and ±W.

It is possible to cause the inverter 9 to output desired voltages by combining the switching patterns shown in FIG. 6 and outputting a voltage vector. When the refrigerant of the compressor 1 is compressed by the motor 8 (a normal operation mode), the motor 8 typically is operated at a frequency equal to or smaller than several tens of hertz to several kilohertz. In this case, further, in the heating mode, it is possible to output a high-frequency voltage exceeding several kilohertz by changing θ at high speed and energize and heat the compressor 1 (a heating operation mode).

However, in the case of a general inverter, the carrier frequency, which is the frequency of the carrier signal, has an upper limit due to the switching speed of the switching elements of the inverter. Therefore, it is difficult to output a high-frequency voltage having a frequency equal to or higher than the carrier frequency. In the case of a general IGBT (Insulate Gate Bipolar Transistor), the upper limit of the switching speed is about 20 kilohertz. When the frequency of the high-frequency voltage is about ⅒ of the carrier frequency, adverse effects may occur such as that the waveform output accuracy of the high-frequency voltage is deteriorated and superposition of the direct-current components is caused. Taking this point into account, if the frequency of the high-frequency voltage is set to be equal to or lower than 2 kilohertz, which is ⅒ of the carrier frequency when the carrier frequency is 20 kilohertz, the frequency of the high-frequency voltage falls within the audible frequency range and therefore noise may increase. In the present embodiment, by changing the phase θ at high speed, it is possible to apply an alternating-current voltage synchronized with the carrier frequency to the windings of the motor 8. Therefore, it is possible to set the alternating-current voltage applied to the motor 8 to be outside the audible frequency.

Figure 7:
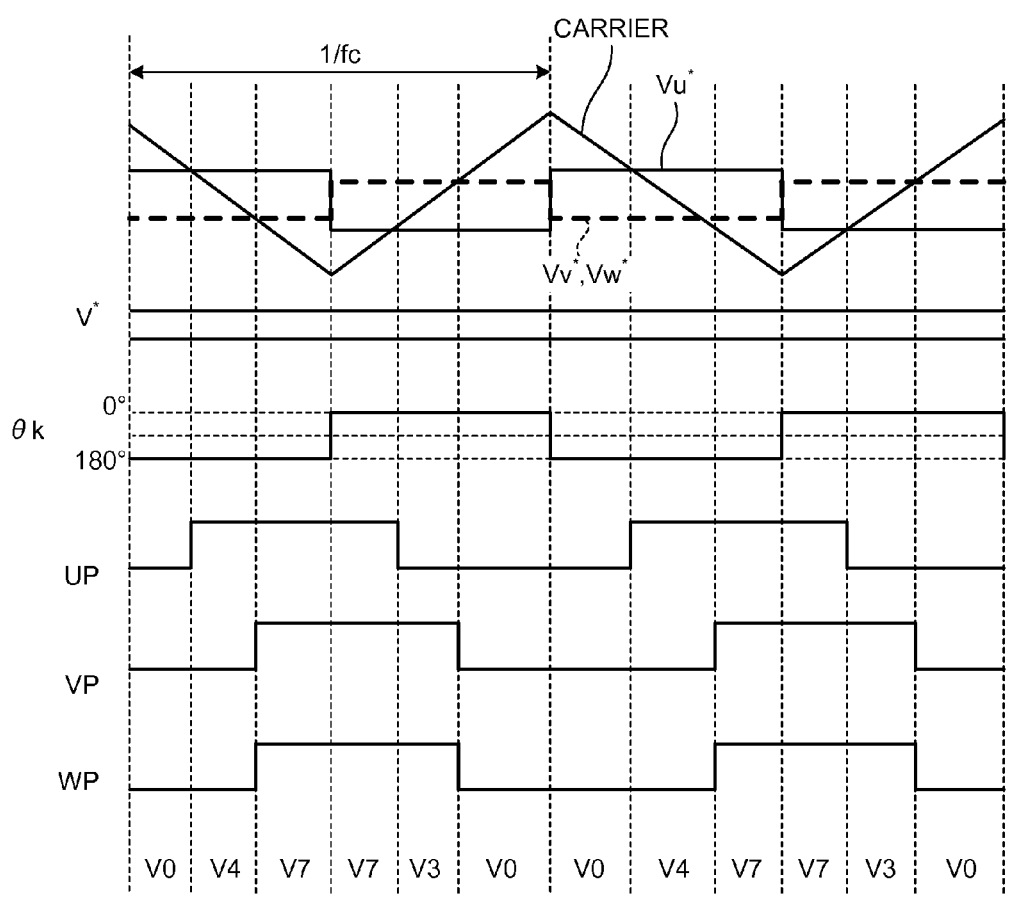
FIG. 7 is a diagram showing an example of PWM signals when a high-frequency phase command θk is switched between 0° and 180°.

Next, an operation for changing the phase θ at high speed using the high-frequency phase command θk is explained. FIG. 7 is a diagram showing an example of the PWM signals when the high-frequency phase command θk output by the heating command unit 24 is switched between 0° and 180°. By switching the high-frequency phase command θk to 0° or 180° at the timing when the carrier signal is at either the top or bottom, it is possible to output PWM signals synchronized with the carrier signal. In this case, the voltage vector changes in the order of V0 (UP=VP=WP=0), V4 (UP=1, VP=WP=0), V7 (UP=VP=WP=1), V3 (UP=0, VP=WP=1), V0 (UP=VP=WP=0), and so on.

Figure 8:
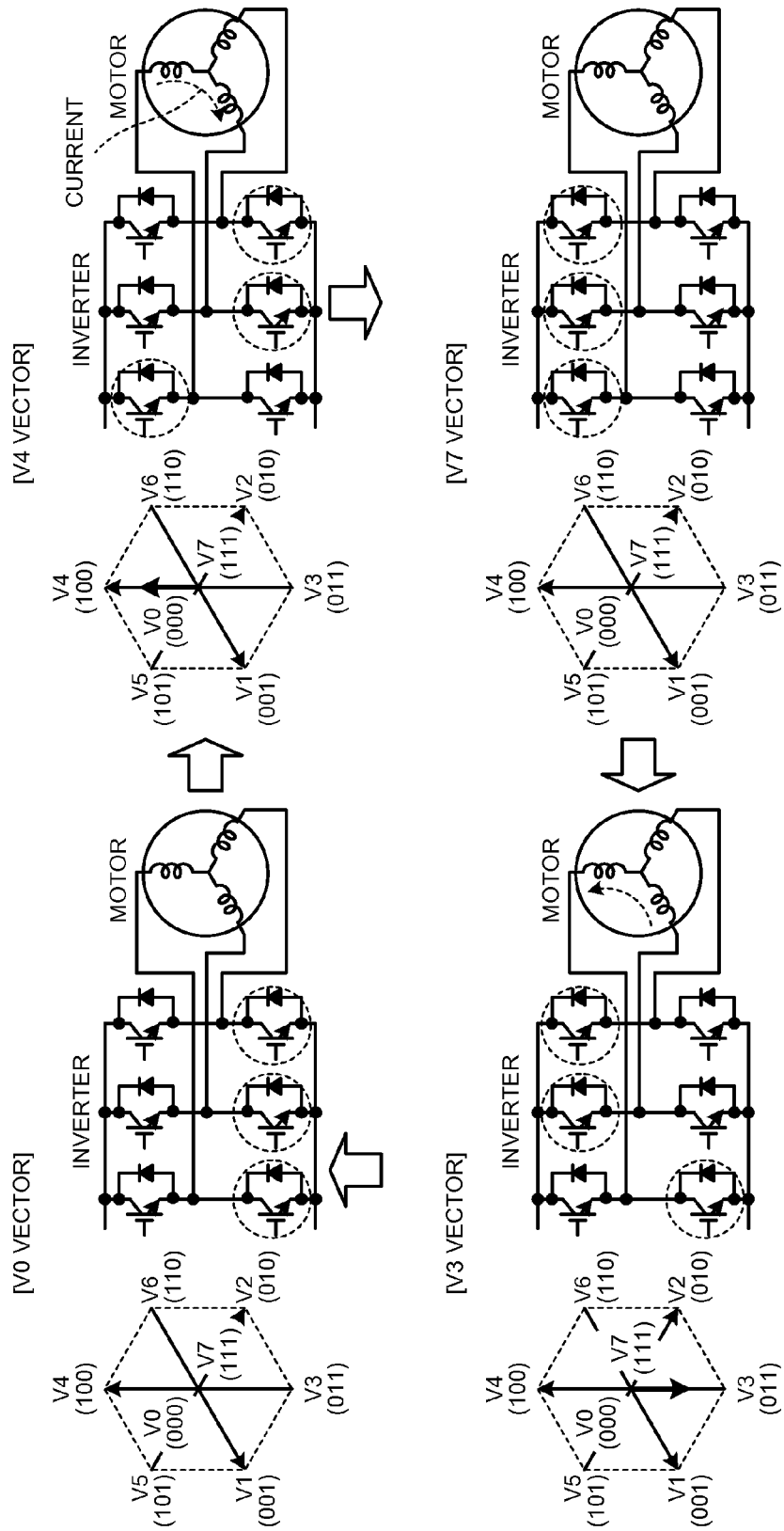
FIG. 8 is an explanatory diagram of a change of a voltage vector shown in FIG. 7.

FIG. 8 is an explanatory diagram of a change of the voltage vector shown in FIG. 7. Note that, in FIG. 8, the switching elements 21 surrounded by broken lines are on and the switching elements 21 not surrounded by the broken lines are off. As shown in FIG. 8, when the V0 vector and the V7 vector are applied, the lines of the motor 8 are short-circuited and any voltage is not output. In this case, the energy accumulated in the inductance of the motor 8 changes to an electric current and flows in the short circuit. When the V4 vector is applied, an electric current (an electric current of +Iu) in the U-phase direction flows. The electric current flows into the motor 8 via the U-phase, and flows out from the motor 8 via the V-phase and the W-phase. When the V3 vector is applied, an electric current (an electric current of −Iu) in the −U-phase direction flows to the windings of the motor 8. The electric current flows into the motor 8 via the V-phase and the W-phase and flows out from the motor 8 via the U-phase. That is, when the V4 vector is applied, the electric current flows to the windings of the motor 8 in the opposite direction to the case when the V3 vector is applied. Because the voltage vector changes in the order of V0, V4, V7, V3, V0, . . . , the electric current of +Iu and the electric current of −Iu alternately flow to the windings of the motor 8. In particular, as shown in FIG. 8, the V4 vector and the V3 vector appear during one carrier period (1/fc); therefore, it is possible to apply an alternating-current voltage synchronized with the carrier frequency fc to the windings of the motor 8. Because the V4 vector (the electric current of +Iu) and the V3 vector (the electric current of −Iu) are alternately output, forward and backward torques are switched instantaneously. Thus, the torques are canceled; therefore, control can be performed such that vibrations of the rotor are suppressed.

Concerning converter control, when the switching element 33 is turned on, conduction of the backflow preventing element 35 is inhibited and a power supply voltage is applied to the reactor 34. When the switching element 33 is turned off, the backflow preventing element 35 is conducted and a voltage is induced to the reactor 34 with a polarity in a direction same as the direction during turn-on of the switching element 33 by the energy accumulated when the switching element 33 is on. In this case, the relation between the power supply voltage and the output voltage of the converter is given by Equation (2). It is seen that it is possible to adjust a bus voltage by adjusting the on-duty.

$$Vdc = D \times Vs \tag{2}$$

Vdc: bus voltage, VS: power supply voltage, D: on-duty

Figure 9:
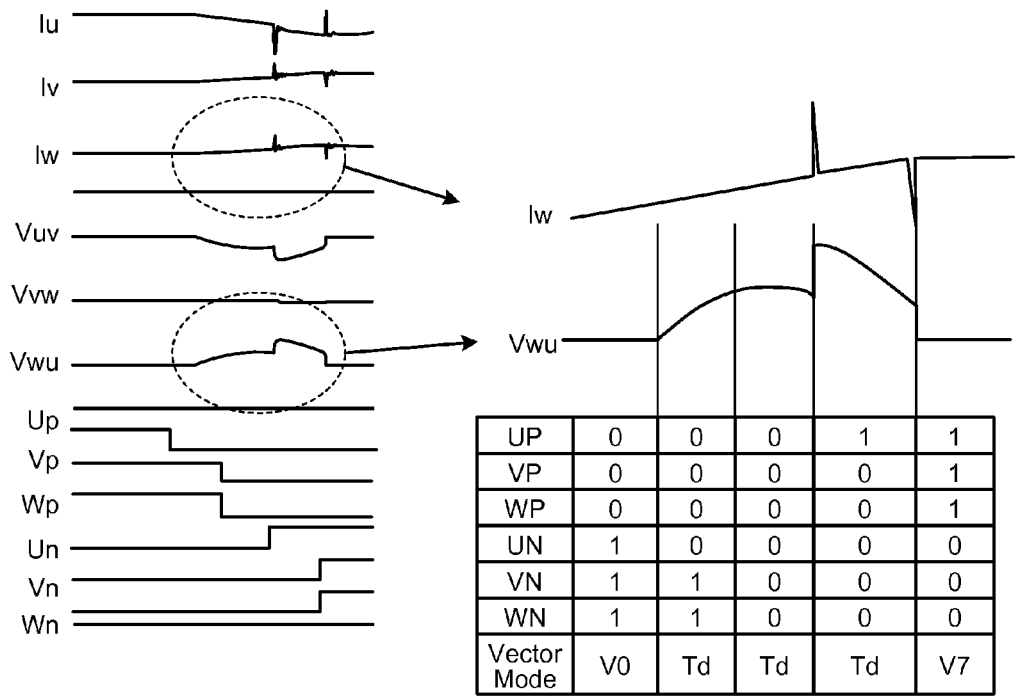
FIG. 9 is a diagram of an example of phase currents, line voltages, and PWM signals when the modulation rate is low.

Note that a Td section, which is a non-energization section, occurs because the bus voltage decreases when the modulation rate is low. Unlike a real vector section, it is difficult to control the Td section from a PWM signal. FIG. 9 shows an example of phase currents, line voltages, and PWM signals when the modulation rate is low. Because the on-duty is low, the Td section occurs. Originally, for example, the real vectors V3 and V4 or the zero vectors V0 and V7 should occur. However, a transition period from the Td section to the Td section or from the Td section to the zero vector section occurs. Further, as shown in the enlarged diagram of the phase current and the line voltage shown on the right side of FIG. 9, in the transition section from the Td section to the Td section or from the Td section to the zero vector V7, dv/dt of the line voltage steeply increases and decreases and, during a high frequency, a pulse current indicated by Iw is generated. This is considered to be a short-circuit phenomenon due to the inter-terminal capacitance and the recovery characteristic of a reflux diode.

Because such a pulse-like electric current is generated, there is a problem in that a loss increase and malfunction of the device occur and stability of the system is impaired. The pulse-like electric current is several hundred nano-seconds and is likely to be a cause of harmonic noise having megahertz. Therefore, in the present embodiment, the modulation rate is set high in the converter control unit 17 and the real vector section is controlled to be set long. Consequently, it is possible to reduce the energy accumulated in an L component of the motor in the Td section. Further, it is possible to suppress the pulse current by suppressing dv/dt of the line voltage. Note that, it is possible to suppress generation of the pulse-like electric current by setting the modulation rate to about 50% or higher.

Figure 10:
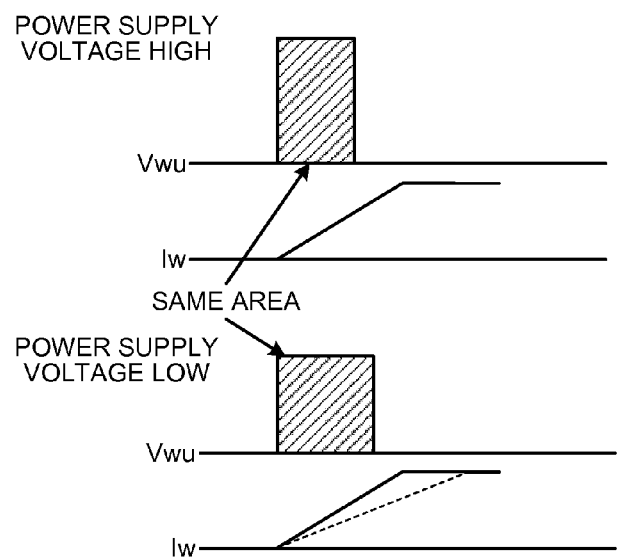
FIG. 10 is a diagram showing the influence of a change in a power supply voltage.

FIG. 10 is a diagram showing the influence of a change in the power supply voltage. When fluctuations occur in the power supply voltage, a problem occurs in that, although the area of a line voltage output is fixed as shown in FIG. 10, di/dt of the output current flowing to the motor winding changes and a heating output fluctuates because the amplitude changes. However, in the first embodiment, the converter 10 is mounted and any output voltage can be input to the inverter 9 even when fluctuations in the power supply voltage occur. Therefore, it is possible to stably supply a heating output desired by the user even when fluctuations in the power supply voltage occur.

In the heating operation mode, the operation is performed at a frequency higher than the operating frequency (up to 1 kilohertz) during the compression operation to apply a high-frequency voltage to the motor 8. Consequently, rotation torque and vibration do not occur. Therefore, it is possible to efficiently heat the motor 8 using an iron loss of the motor 8 due to the high-frequency voltage application and a copper loss caused by an electric current flowing in the winding. By the motor 8 being heated, the liquid refrigerant stagnated in the compressor 1 is heated and vaporized and leaked to the outside of the compressor 1. The refrigerant-stagnation detecting unit 25 determines that refrigerant leakage occurs by a predetermined amount or for a predetermined time to discriminate a return from the stagnated state to the normal state and ends the heating of the motor 8.

As explained above, in the heat pump device 100 according to the present embodiment, when the liquid refrigerant stagnates in the compressor 1, it is possible to heat the motor 8 highly efficiently while suppressing noise by changing a phase at high speed and by feeding an electric current having a frequency outside the audible frequency range (20 hertz to 20 kilohertz) to the motor 8 with high-frequency energization that satisfies the necessary amount of heat desired by the user. Accordingly, the liquid refrigerant stagnated in the compressor 1 can be efficiently heated, and the stagnated liquid refrigerant can be leaked to the outside of the compressor 1.

The output is kept fixed by setting the ratio of the bus voltage and the amplitude high with the step-down converter (the converter 10). It is possible to provide a device with high reliability by suppressing occurrence of the pulse-like current.

In general, the operating frequency during the compressor operation is about 1 kilohertz at most. Therefore, a high-frequency voltage having a frequency equal to or larger than 1 kilohertz only has to be applied to the motor 8 in order to highly efficiently perform the heating. For example, if a high-frequency voltage equal to or higher than 14 kilohertz is applied to the motor 8, vibration sound of an iron core of the motor 8 approaches nearly the upper limit of the audible frequency range. Therefore, there is an effect for reducing noise. Therefore, for example, the motor 8 only has to be controlled to set the high-frequency voltage to about 20 kilohertz outside the audible frequency range.

Note that if the frequency of the high-frequency voltage exceeds the maximum rated frequency of the switching elements 21a to 21f, element breakage is caused and thus a load or power supply short-circuit may occur. Therefore, it is desirable to set the frequency of the high-frequency voltage to be equal to or lower than the maximum rated frequency in order to ensure reliability.

In the case of a heating device having a frequency exceeding 10 kilohertz and an output exceeding 5 watts, because there is the restriction due to Article 100 of the Radio law, it is possible to perform heating of the compressor 1 conforming to the Radio law by adjusting the amplitude of a voltage command beforehand not to exceed 50 watts and detecting a flowing electric current and feeding back the electric current to set the output to be equal to or lower than 50 watts.

Second Embodiment

Next, a heat pump device in a second embodiment according to the present invention is explained. The configuration of the heat pump device 100 in the present embodiment is the same as the configuration in the first embodiment. The portions different from the first embodiment are explained.

Figure 11:
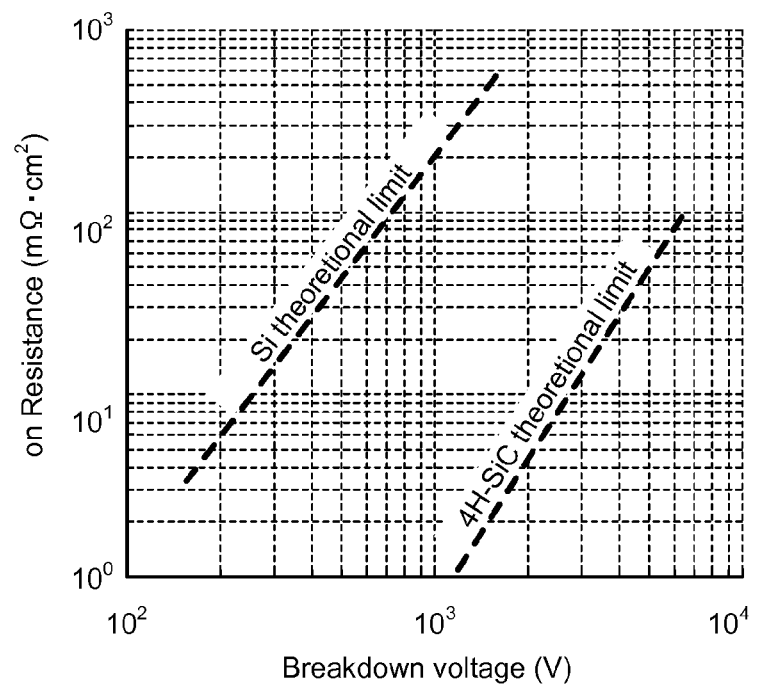
FIG. 11 is a diagram showing the relation between the breakdown voltage and the on resistance of an Si device and an SiC device.

The heat pump device in the present embodiment is such that the switching elements 21a to 21f shown in FIG. 2 are switching elements of a silicon carbide device (hereinafter, SiC device), which is a wide bandgap semiconductor device. FIG. 11 is a diagram showing the relation between the breakdown voltage and the on resistance of an Si device and the SiC device. Currently, it is typically mainstream to use semiconductors made of silicon (Si). It is known that an SiC device has a larger bandgap than an Si device and can significantly improve the trade-off between the breakdown voltage and the on resistance. For example, a cooling device and a radiator fin are essential for currently used induction heating cookers in which Si devices are used, and the element loss can be significantly reduced by using SiC devices, which are wide bandgap semiconductor devices. Therefore, conventional cooling devices and radiator fins can be reduced in size or eliminated.

As described above, the loss can be significantly reduced by changing the switching elements from conventional Si devices to SiC devices; therefore, cooling devices and radiator fins can be reduced in size or eliminated. Accordingly, the cost of the device itself can be significantly reduced. Moreover, switching can be performed at high frequency; therefore, an electric current with a higher frequency can be caused to flow in the motor 8. Accordingly, the winding current is reduced due to the increase of the winding impedance of the motor 8; therefore, the electric current flowing in the inverter 9 is reduced. Thus, a heat pump device with a higher efficiency can be obtained. The increase in frequency enables the drive frequency to be set to a high frequency equal to or higher than 16 kilohertz, which is within the human audible range; therefore, there is an advantage in that it is easy to take measures against noise.

Moreover, when SiC is used, a very large electric current can be caused to flow with low loss compared with the case of the conventional Si; therefore, it is possible to obtain effects, such as reducing the size of cooling fins. In the present embodiment, an SiC device is explained as an example; however, it will be apparent to those skilled in the art that similar effects are obtained by using wide bandgap semiconductor devices formed from diamond, gallium nitride (GaN), or the like instead of SiC. A wide bandgap semiconductor may be used only for the diode of each switching element included in the inverter. Moreover, part of (at least one of) a plurality of switching elements may be formed from a wide bandgap semiconductor. The effects described above can be obtained even when a wide bandgap semiconductor is used for only part of the elements.

In the first and second embodiments, it is assumed that IGBTs are mainly used as the switching elements; however, the switching elements are not limited to IGBTs, and it is apparent to those skilled in the art that similar effects are obtained even by using power MOSFETs (Metal-Oxide-Semiconductor Field-Effect Transistors) having a super junction structure or other insulated gate semiconductor devices, or bipolar transistors. Configurations and operations in the present embodiment other than those explained above are the same as those in the first embodiment.

Third Embodiment

Figure 12:
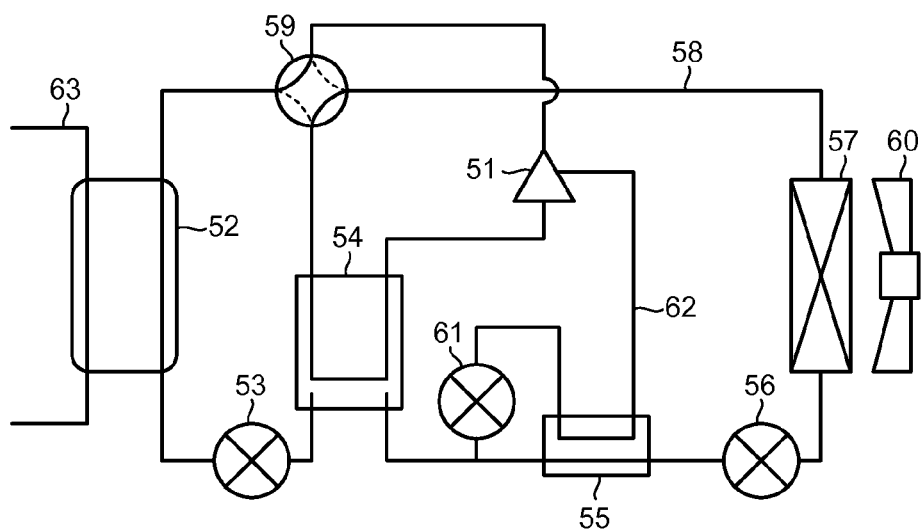
FIG. 12 is a diagram of a configuration example of a heat pump device in a third embodiment.

FIG. 12 is a diagram of a configuration example of a third embodiment of the heat pump device according to the present invention. In the present embodiment, an explanation will be given of an example of configurations and operations when the heat pump device explained in the first and second embodiment is mounted on an air conditioner, a heat pump water heater, a refrigerator, a freezer, and the like.

Figure 13:
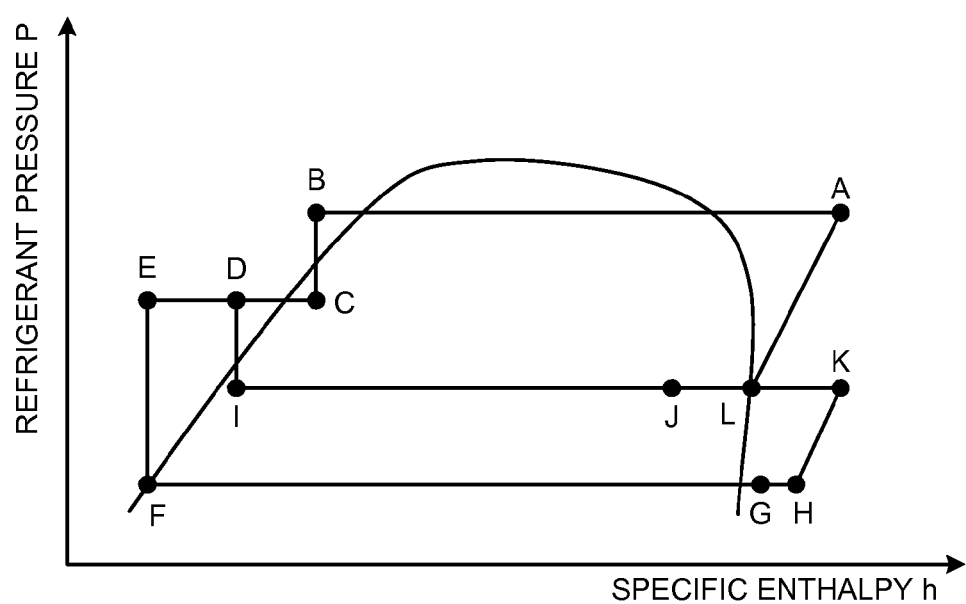
FIG. 13 is a Mollier diagram of the state of a refrigerant of the heat pump device shown in FIG. 12.

FIG. 13 is a Mollier diagram of the state of the refrigerant of the heat pump device shown in FIG. 12. In FIG. 13, the horizontal axis indicates the specific enthalpy and the vertical axis indicates the refrigerant pressure.

In the heat pump device in the present embodiment, a compressor 51, a heat exchanger 52, an expansion mechanism 53, a receiver 54, an internal heat exchanger 55, an expansion mechanism 56, and a heat exchanger 57 are sequentially connected by a pipe, thereby configuring a main refrigerant circuit 58 through which the refrigerant circulates. In the main refrigerant circuit 58, a four-way valve 59 is provided on the discharge side of the compressor 51; therefore, the circulation direction of the refrigerant can be switched. A fan 60 is provided near the heat exchanger 57. The compressor 51 is the compressor 1 explained in the first and second embodiments described above and is a compressor that includes the motor 8 driven by the inverter 9 and the compression mechanism 7. Although not shown in FIG. 13, the heat pump device in the present embodiment includes the inverter 9 that drives the motor 8 of the compressor 51, the inverter control unit 12, the bus-voltage detecting unit 11, the converter 10, and the converter control unit 17.

Furthermore, the heat pump device in the present embodiment includes an injection circuit 62 that connects, by a pipe, from between the receiver 54 and the internal heat exchanger 55 to an injection pipe of the compressor 51. An expansion mechanism 61 and the internal heat exchanger 55 are sequentially connected to the injection circuit 62. A water circuit 63 in which water is circulated is connected to the heat exchanger 52. A device that uses water, such as a hot water dispenser and a radiator, examples of which include a floor heating, is connected to the water circuit 63.

The operation of the heat pump device in the present embodiment is explained. First, an operation during the heating operation is explained. In the heating operation, the four-way valve 59 is set in the direction of the solid line. The heating operation includes not only heating used for air conditioning but also a hot-water supply for applying heat to water to make hot water.

The gas-phase refrigerant (at point A in FIG. 13) that has become a refrigerant having a high temperature and a high pressure in the compressor 51, is discharged from the compressor 51 and exchanges heat in the heat exchanger 52, which functions as a condenser and a radiator, to be liquefied (at point B in FIG. 13). At this point, water circulating in the water circuit 63 is heated by the heat radiated from the refrigerant and is used for heating and hot-water supply.

The liquid-phase refrigerant liquefied in the heat exchanger 52 is decompressed in the expansion mechanism 53 and enters a gas-liquid two-phase state (at point C in FIG. 13). The refrigerant that has entered a gas-liquid two-phase state in the expansion mechanism 53 exchanges heat with the refrigerant drawn into the compressor 51 by the receiver 54 so as to be cooled and liquefied (at point D in FIG. 13). The liquid-phase refrigerant liquefied in the receiver 54 is divided between the main refrigerant circuit 58 and the injection circuit 62 and flows therein.

The liquid-phase refrigerant flowing in the main refrigerant circuit 58 exchanges heat with the refrigerant flowing in the injection circuit 62 (refrigerant that is decompressed in the expansion mechanism 61 and has entered a gas-liquid two-phase state) in the internal heat exchanger 55 and is further cooled (at point E in FIG. 13). The liquid-phase refrigerant cooled in the internal heat exchanger 55 is decompressed in the expansion mechanism 56 and enters a gas-liquid two-phase state (at point F in FIG. 13). The refrigerant that has entered a gas-liquid two-phase state in the expansion mechanism 56 exchanges heat with the outside air in the heat exchanger 57, which functions as an evaporator, and is heated (at point G in FIG. 13). The refrigerant heated in the heat exchanger 57 is further heated in the receiver 54 (at point H in FIG. 13) and is drawn into the compressor 51.

On the other hand, as described above, the refrigerant flowing in the injection circuit 62 is decompressed in the expansion mechanism 61 (at point I in FIG. 13) and exchanges heat in the internal heat exchanger 55 (at point J in FIG. 13). The refrigerant (injection refrigerant) that has exchanged heat in the internal heat exchanger 55 and is in the gas-liquid two-phase state flows into the compressor 51 from the injection pipe of the compressor 51 while remaining in the gas-liquid two-phase state.

In the compressor 51, the refrigerant drawn in from the main refrigerant circuit 58 (at point H in FIG. 13) is compressed to an intermediate pressure and heated (at point K in FIG. 13). The injection refrigerant (at point J in FIG. 13) joins the refrigerant compressed to the intermediate pressure and heated (at point K in FIG. 13), thereby decreasing the temperature (at point L in FIG. 13). The refrigerant having the decreased temperature (at point L in FIG. 13) is further compressed and heated to have a high temperature and a high pressure, and is discharged (at point A in FIG. 13).

When the injection operation is not performed, the aperture of the expansion mechanism 61 is fully closed. In other words, when the injection operation is performed, the aperture of the expansion mechanism 61 is larger than a predetermined aperture. However, when the injection operation is not performed, the aperture of the expansion mechanism 61 is set to be smaller than the predetermined aperture. Accordingly, the refrigerant does not flow into the injection pipe of the compressor 51. The aperture of the expansion mechanism 61 is electronically controlled by using a microcomputer or the like.

The operation of the heat pump device 100 during the cooling operation is explained next. In the cooling operation, the four-way valve 59 is set in the direction indicated by the broken line. The cooling operation includes not only cooling used for air conditioning but also drawing heat from water to make cold water, performing refrigeration, and the like.

The gas-phase refrigerant (at point A in FIG. 13) that has become a refrigerant having a high temperature and a high pressure in the compressor 51 is discharged from the compressor 51, flows to the heat exchanger 57 side through the four-way valve 59, and exchanges heat in the heat exchanger 57, which functions as a condenser and a radiator, to be liquefied (at point B in FIG. 13). The liquid-phase refrigerant liquefied in the heat exchanger 57 is decompressed in the expansion mechanism 56 and enters a gas-liquid two-phase state (at point C in FIG. 13). The refrigerant that has entered a gas-liquid two-phase state in the expansion mechanism 56 exchanges heat with the refrigerant flowing in the injection circuit 62 in the internal heat exchanger 55 and is cooled and liquefied (at point D in FIG. 13). In the internal heat exchanger 55, the refrigerant that has entered a gas-liquid two-phase state in the expansion mechanism 56 exchanges heat with the refrigerant (at point I in FIG. 13) that has entered a gas-liquid two-phase state by decompressing the liquid-phase refrigerant liquefied in the internal heat exchanger 55, in the expansion mechanism 61. The liquid-phase refrigerant (at point D in FIG. 13) exchanged heat in the internal heat exchanger 55 is divided between the main refrigerant circuit 58 and the injection circuit 62 and flows therein.

The liquid-phase refrigerant flowing in the main refrigerant circuit 58 then exchanges heat with the refrigerant drawn into the compressor 51 in the receiver 54 and is further cooled (at point E in FIG. 13). The liquid-phase refrigerant cooled in the receiver 54 is decompressed in the expansion mechanism 53 and enters a gas-liquid two-phase state (at point F in FIG. 13). The refrigerant that has entered a gas-liquid two-phase state in the expansion mechanism 53 exchanges heat in the heat exchanger 52, which functions as an evaporator, and is heated (at point G in FIG. 13). At this point, because the refrigerant absorbs heat, water circulating in the water circuit 63 is cooled and used for cooling and refrigeration. Then, the refrigerant heated in the heat exchanger 52 flows to the receiver 54 through the four-way valve 59 and is further heated in the receiver 54 (at point H in FIG. 13) and drawn into the compressor 51.

On the other hand, the refrigerant flowing in the injection circuit 62 is decompressed in the expansion mechanism 61 (at point I in FIG. 13) as described above, and exchanges heat in the internal heat exchanger 55 (at point J in FIG. 13). The refrigerant (injection refrigerant) that has exchanged heat in the internal heat exchanger 55 and is in a gas-liquid two-phase state flows into the compressor 51 from the injection pipe of the compressor 51 while remaining in the gas-liquid two-phase state. The compression operation in the compressor 51 is the same as that of the heating operation described above.

When the injection operation is not performed, as in the heating operation described above, the aperture of the expansion mechanism 61 is fully closed so as not to result in the refrigerant flowing into the injection pipe of the compressor 51.

In the above explanations, the heat exchanger 52 has been explained as a heat exchanger like a plate type heat exchanger that exchanges heat between the refrigerant and water circulating in the water circuit 63. However, the heat exchanger 52 is not limited thereto and may be other types of heat exchangers that exchange heat between a refrigerant and air. The water circuit 63 may not be a circuit in which water is circulated, but may be a circuit in which a fluid other than water is circulated.

As described above, the heat pump device explained in the first, second, and third embodiments can be used for a heat pump device using an inverter compressor in an air conditioner, a heat pump water heater, a refrigerator, a freezer, and the like.

INDUSTRIAL APPLICABILITY

As explained above, the heat pump device according to the present invention is useful as a heat pump device capable of efficiently solving a refrigerant stagnation phenomenon.

The invention claimed is:
1. A heat pump device comprising:
a compressor unit including a compressor that compresses a refrigerant and a motor that drives the compressor;
an inverter that is electrically connected to the motor and applies a voltage to the motor for driving the motor;
a converter that applies a voltage to the inverter;
an inverter control unit that generates a driving signal for driving the inverter, the inverter control including:
a first driving-signal generating unit that generates a signal for driving the inverter and outputs the signal to the inverter;
a heating-operation-mode control unit that controls heating the compressor; and
a normal-operation-mode control unit that performs normal operation of the heat pump device; and
a converter control unit that includes a bus-voltage-command-value estimating unit, a bus-voltage control unit, and a second driving-signal generating unit and generates a driving signal for driving the converter on the basis of a signal received from the inverter control unit and a signal received from a bus-voltage detecting unit and outputs the driving signal to the converter, wherein
the inverter control unit includes a heating operation mode in which a heating operation of the compressor is performed by applying a high-frequency alternating-current voltage to the motor,
the heating-operation-mode control unit controls the first driving-signal generating unit causing the first driving-signal generating unit to output, as inverter driving signals, PWM signals for heating the compressor without rotationally driving the motor by feeding a high-frequency current to the motor that the motor cannot follow, and
the converter control unit changes, in the heating operation mode of the inverter control unit, a voltage applied to the inverter according to a voltage applied to the motor.
2. The heat pump device according to claim 1, wherein the inverter control unit is configured to change at least any one of a frequency, a phase, and an amplitude of a high-frequency alternating-current voltage applied to the motor in the heating operation mode of the inverter control unit.
3. The heat pump device according to claim 1, wherein the converter is a step-down converter that steps down a bus voltage applied to the inverter.
4. The heat pump device according to claim 1, wherein the converter control unit performs control such that a ratio of a voltage applied to the inverter to a voltage applied to the motor by the inverter is set to 50% or higher.
5. The heat pump device according to claim 1, wherein at least one of a plurality of switching elements configuring the inverter is formed from a wide bandgap semiconductor.
6. The heat pump device according to claim 5, wherein the wide bandgap semiconductor is silicon carbide, a gallium nitride material, or diamond.
7. The heat pump device according to claim 1, wherein at least one of a plurality of diodes of switching elements configuring the inverter is formed from a wide bandgap semiconductor.
8. The heat pump device according to claim 7, wherein the wide bandgap semiconductor is silicon carbide, a gallium nitride material, or diamond.
9. The heat pump device according to claim 1, wherein where a frequency of the high-frequency alternating-current voltage exceeds 10 kilohertz, the inverter control unit controls input power to the motor to 50 watts or less.

10. An air conditioner comprising the heat pump device according to claim 1.

11. A freezer comprising the heat pump device according to claim 1.

* * * * *